US010860570B2

(12) United States Patent
Ebel et al.

(10) Patent No.: US 10,860,570 B2
(45) Date of Patent: Dec. 8, 2020

(54) SYSTEM, METHOD AND COMPUTER PROGRAM PRODUCT FOR IDENTIFICATION OF ANOMALIES IN PERFORMANCE INDICATORS OF TELECOM SYSTEMS

(71) Applicant: TEOCO LTD., Rosh Ha'ayin (IL)

(72) Inventors: Shachar Ebel, Mevaseret Zion (IL); Yuval Stein, Ramat-Hasharon (IL); Adir Pridor, Herzliya (IL); Alexander Virtser, Tel-Aviv (IL)

(73) Assignee: TEOCO LTD., Rosh Ha'ayin (IL)

( * ) Notice: Subject to any disclaimer, the term of this patent is extended or adjusted under 35 U.S.C. 154(b) by 390 days.

(21) Appl. No.: 14/535,305

(22) Filed: Nov. 6, 2014

(65) Prior Publication Data

US 2015/0134622 A1 May 14, 2015

Related U.S. Application Data

(60) Provisional application No. 61/900,418, filed on Nov. 6, 2013.

(51) Int. Cl.

*G06F 16/23* (2019.01)
*G06F 16/22* (2019.01)
*H04L 29/08* (2006.01)
*G06F 11/07* (2006.01)

(52) U.S. Cl.

CPC ........ *G06F 16/2365* (2019.01); *G06F 11/079* (2013.01); *G06F 16/22* (2019.01); *H04L 67/30* (2013.01)

(58) Field of Classification Search

CPC ......... G06F 17/30241; G06F 17/30371; G06F 11/00; G06F 11/079; G06F 16/2365; H04M 3/085; H04M 3/28; H04L 67/30

See application file for complete search history.

(56) References Cited

U.S. PATENT DOCUMENTS 7,103,509 B2 9/2006 Shah et al.
7,257,513 B2 8/2007 Lilly
7,286,962 B2 10/2007 Di Palmi et al.

(Continued)

*Primary Examiner* — Marcin R Filipczyk

(74) *Attorney, Agent, or Firm* — David, Brody & Dondershine, LLP; Ralph P. Albrecht

(57) ABSTRACT

A system and method for identifying anomalies in indicators, such as key performance indicators (KPIs) of a telecom system are disclosed. The method can learn over time behavior of the indicator and can statistically identify what should be considered anomalous. Learning can be performed on a per indicator basis that each presents different statistical qualities. The method can associate the indicator to a profile, such as one of several statistical distributions and can operate accordingly. Association may be determined by the correlation of the indicator to statistical distribution. The method can identify correlations between indicators when identifying the statistical distribution and especially when the associated statistical distribution is an unidentified profile. The method can include comparison of actuals versus prediction and sending alerts when anomalies are found. The system can be configured to receive data points respective of indicators and implement the method while continuously determining data points constituting anomalies.

30 Claims, 2 Drawing Sheets

START
210 RECEIVE A DATA SERIES RESPECTIVE OF AN INDICATOR
220 DETERMINE A PROFILE RESPECTIVE OF THE DATA SERIES
230 ASSOCIATE THE PROFILE WITH THE INDICATOR
240 STORE IN A MEMORY THE ASSOCIATED PROFILE AND THE INDICATOR
250 DETERMINE A THRESHOLD RESPECTIVE OF THE DETERMINED PROFILE
END
200

(56) References Cited

U.S. PATENT DOCUMENTS

| | | | |
|---|---|---|---|
| 7,496,472 | B2 | 2/2009 | Seem |
| 7,890,297 | B2 | 2/2011 | Di Palmi et al. |
| 8,094,579 | B2 | 1/2012 | Olsson et al. |
| 8,112,305 | B2 | 2/2012 | Shimizu |
| 2004/0176040 | A1 | 9/2004 | Thornton et al. |
| 2005/0262394 | A1* | 11/2005 | Yasukawa ........... G06F 11/0733 714/23 |
| 2007/0036309 | A1* | 2/2007 | Zoldi ................... H04Q 3/0029 379/114.14 |
| 2012/0036140 | A1* | 2/2012 | Nielsen ............. G06F 17/30241 707/754 |
| 2018/0060155 | A1* | 3/2018 | Tran Van .............. G06F 11/079 |

* cited by examiner

SYSTEM, METHOD AND COMPUTER PROGRAM PRODUCT FOR IDENTIFICATION OF ANOMALIES IN PERFORMANCE INDICATORS OF TELECOM SYSTEMS

CROSS REFERENCE TO RELATED APPLICATIONS

The present disclosure is a US NonProvisional Patent Application, which claims the benefit under 35 U.S.C. Section 119(e) of U.S. Provisional Patent Application No. 61/900,418, Conf. No. 6126, filed Nov. 6, 2013, entitled, "A Method for Identification of Anomalies in Performance Indicators of Telecom Systems," the contents of which is incorporated herein by reference in its entirety.

BACKGROUND

Field of the Disclosure

The present disclosure relates generally to telecommunications systems, and more particularly to performance indicators of telecommunications systems.

Related Art

Exemplary systems having multiple elements communicating with each other, such as, e.g., but not limited to, telecommunications network systems often require performance measurement. Performance indicators of an analyzed system, such as key performance indicators (KPIs) and/or key quality indicators (KQIs) are used to evaluate operational activities, such as, for example, but not limited to, system down-time, number of dropped calls and the like. Occasionally, when anomalies occur, an operator of such systems desires to know about the anomalies as soon as possible. Conventional solutions compare a data point to a performance indicator which averages numerous data points of the same data series. The data point is compared to the average within a threshold. If the data point exceeds the threshold, then the result is reported. These conventional methods have various shortcomings, including difficulty in accurately and reliably reporting anomalies. Accurately and reliably reporting anomalies is difficult since what is considered by the operator an anomaly at one point in time may not necessarily be considered an anomaly at a second point in time.

SUMMARY

The disclosure sets forth systems, methods and computer program products relating to identification of anomalies in performance indicators in telecommunications systems, and to statistically identifying anomalies in indicators.

Accordingly, various example embodiments of the present disclosure are directed to a system, method and/or a computer program product for classification of an indicator respective of a data series. According to an exemplary embodiment an example computer-implemented method of classification of an indicator respective of a data series may include, e.g., but may not be limited to, receiving, by at least one computer processor, from at least a source of information, at least the data series respective of the indicator measured by the at least a source of information; determining, by the at least one computer processor, for the indicator respective of the at least a data series, a profile from a plurality of possible profiles; associating, by the at least one computer processor, the indicator with the respective profile; and storing, by the at least one computer processor, the associated profile with the respective indicator.

According to an exemplary embodiment an example computer-implemented method may include where the profile is one of: a distribution profile, a behavioral profile, or an unidentified profile.

According to an exemplary embodiment an example computer-implemented method may include where the profile is a distribution, and wherein the distribution is one of: normal; Poisson, or unidentified.

According to an exemplary embodiment an example computer-implemented method may include where the profile is a distribution profile and further comprising: determining, by the at least one computer processor, at least a first parameter respective of the distribution profile and respective of the at least a data series.

According to an exemplary embodiment an example computer-implemented method may further include determining, by the at least one computer processor, a noise to signal ratio respective of the distribution profile.

According to an exemplary embodiment an example computer-implemented method may further include determining, by the at least one computer processor, correlation of a first data series with at least a second data series, wherein the first data series is associated with the unidentified distribution.

According to an exemplary embodiment an example computer-implemented method may further include reporting, by the at least one computer processor, identification of the at least a data series or the indicator wherein the associated respective profile is the unidentified profile.

According to an exemplary embodiment an example computer-implemented method may further include receiving, by the at least one computer processor, a new profile respective of the at least a data series identified to have the unidentified profile.

According to an exemplary embodiment an example computer-implemented method may further include associating, by the at least one computer processor, the at least a data series identified to have the unidentified profile with an existing profile of the plurality of possible profiles.

According to an exemplary embodiment an example computer-implemented method may include where the indicator is any of: a key performance indicator (KPI), a counter, and/or a key quality indicator (KQI).

According to an exemplary embodiment an example computer-implemented method may further include receiving, by the at least one computer processor, a current data point respective of the at least a data series; comparing, by the at least one computer processor, the current data point to the profile of the at least a data series; and determining, by the at least one computer processor, existence of an anomalous data point respective of the current data point and respective of the profile of the at least a data series.

According to another exemplary embodiment an example system may include a system of classification of an indicator respective of a data series, which may include at least one computer processing unit; a network interface communicatively coupled to the at least one computer processing unit; a memory communicatively coupled to the at least one computer processing unit, the memory containing instructions that when executed by the at least one computer processing unit configure the system to: receive from at least a source of information at least a data series respective of the indicator measured by the at least a source of information; determine for the indicator respective of the at least a data series a profile from a plurality of possible profiles; associate the indicator with the respective profile; and store the associated profile with the respective indicator.

According to an exemplary embodiment an example system may include where the profile is one of: a distribution, a behavioral, or an unidentified profile.

According to an exemplary embodiment an example system may include where the profile is a distribution, and wherein the distribution is one of: normal; Poisson; or unidentified.

According to an exemplary embodiment an example system may include where profile is a distribution profile and wherein the memory further contains instructions that when executed by the at least one computer processing unit configure the system to: determine at least a first parameter respective of the distribution profile and respective of the at least a data series.

According to an exemplary embodiment an example system may include where the memory further contains instructions that when executed by the at least one computer processing unit configure the system to: determine a noise to signal ratio respective of the distribution profile.

According to an exemplary embodiment an example system may include where the memory further contains instructions that when executed by the at least one computer processing unit configure the system to: determine a correlation of a first data series with at least a second data series, wherein the first data series is associated with the unidentified distribution.

According to an exemplary embodiment an example system may include where the memory further contains instructions that when executed by the at least one computer processing unit configure the system to: report identification of the at least a data series or the indicator wherein the associated respective profile is the unidentified profile.

According to an exemplary embodiment an example system may include where the memory further contains instructions that when executed by the at least one computer processing unit configure the system to: receive a new profile respective of the at least a data series identified to have the unidentified profile.

According to an exemplary embodiment an example system may include where the memory further contains instructions that when executed by the at least one computer processing unit configure the system to: associate the at least a data series identified to have the unidentified profile with an existing profile of the plurality of possible profiles.

According to an exemplary embodiment an example system may include where the indicator is any of: a key performance indicator (KPI), a counter, and/or a key quality indicator (KQI).

According to an exemplary embodiment an example system may include where the memory further contains instructions that when executed by the at least one computer processing unit configure the system to: receive a current data point respective of the at least a data series; compare the current data point to the profile of the at least a data series; and determine existence of an anomalous data point respective of the current data point and respective of the profile of the at least a data series.

According to yet another exemplary embodiment a computer program product embodied on a computer accessible medium, the computer program product including program logic, which when executed on at least one computer processor provides a method of classification of an indicator respective of a data series, the method including, according to an exemplary embodiment, receiving, by at least one computer processor, from at least a source of information, at least the data series respective of the indicator measured by the at least a source of information; determining, by the at least one computer processor, for the indicator respective of the at least a data series, a profile from a plurality of possible profiles; associating, by the at least one computer processor, the indicator with the respective profile; and storing, by the at least one computer processor, the associated profile with the respective indicator.

According to an exemplary embodiment an example computer program product may include where the method may include where the profile is one of: a distribution profile, a behavioral profile, or an unidentified profile.

According to an exemplary embodiment an example computer program product may include where the method may include where the profile is a distribution, and wherein the distribution is one of: normal; Poisson, or unidentified.

According to an exemplary embodiment an example computer program product may include where the method may include where the profile is a distribution profile and may further include: determining, by the at least one computer processor, at least a first parameter respective of the distribution profile and respective of the at least a data series.

According to an exemplary embodiment an example computer program product may include where the method may further include determining, by the at least one computer processor, a noise to signal ratio respective of the distribution profile.

According to an exemplary embodiment an example computer program product may include where the method may further include determining, by the at least one computer processor, correlation of a first data series with at least a second data series, wherein the first data series is associated with the unidentified distribution.

According to an exemplary embodiment an example computer program product may include where the method may further include reporting, by the at least one computer processor, identification of the at least a data series or the indicator wherein the associated respective profile is the unidentified profile.

According to an exemplary embodiment an example computer program product may include where the method may further include receiving, by the at least one computer processor, a new profile respective of the at least a data series identified to have the unidentified profile.

According to an exemplary embodiment an example computer program product may include where the method may further include associating, by the at least one computer processor, the at least a data series identified to have the unidentified profile with an existing profile of the plurality of possible profiles.

According to an exemplary embodiment an example computer program product may include where the method may include where the indicator is any of: a key performance indicator (KPI), a counter, or a key quality indicator (KQI).

According to an exemplary embodiment an example computer program product may include where the method may further include receiving, by the at least one computer processor, a current data point respective of the at least a data series; comparing, by the at least one computer processor, the current data point to the profile of the at least a data series; and determining, by the at least one computer processor, existence of an anomalous data point respective of the current data point and respective of the profile of the at least a data series.

BRIEF DESCRIPTION OF THE DRAWINGS

The subject matter herein is particularly pointed out and distinctly claimed in the claims at the conclusion of the specification. The foregoing and other objects, features and advantages will be apparent from the following detailed description taken in conjunction with the accompanying drawings.

The accompanying drawings, which are included to provide a further understanding and are incorporated in and constitute a part of this specification, illustrate exemplary, and nonlimiting embodiments and together with the description serve to explain the principles disclosed herein. In the drawings, like reference numbers may indicate substantially similar, equivalent, or exemplary elements, and the left most digits in the corresponding reference number indicate the drawing in which an element first appears.

DETAILED DESCRIPTION OF VARIOUS EXEMPLARY EMBODIMENTS

Figure 1:
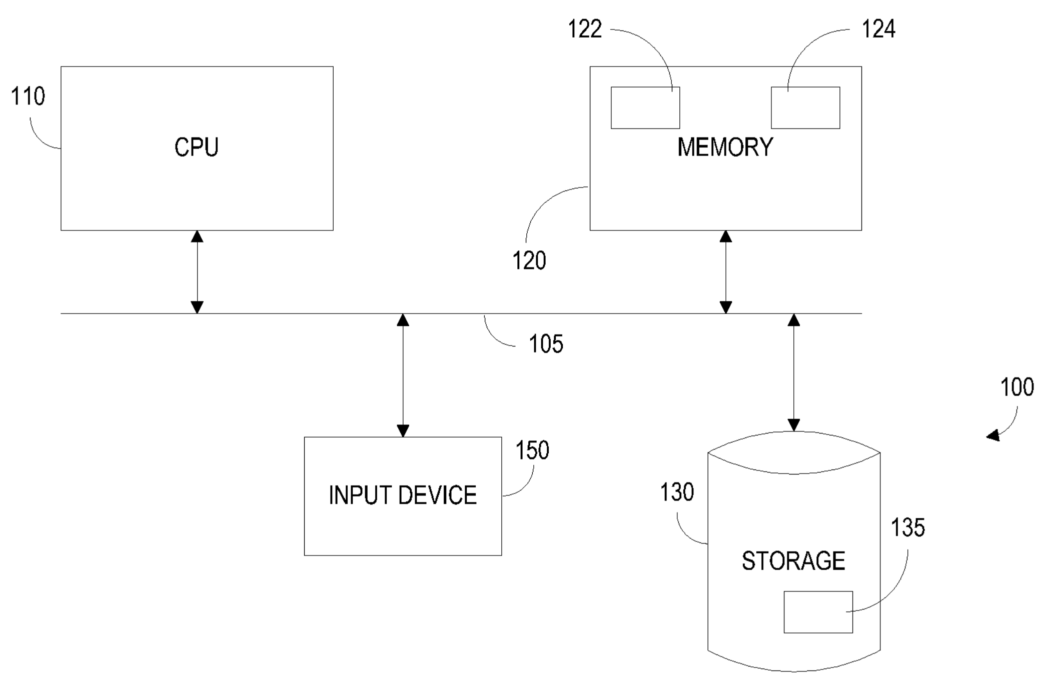
FIG. 1 depicts a schematic illustration of a system according to an example embodiment.

It is important to note that the embodiments disclosed are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like reference numerals may refer to like parts through several views.

Reference will now be made in detail to various exemplary embodiments, examples of which are illustrated in the accompanying drawings. While specific exemplary embodiments are discussed, it should be understood that this is done for illustration purposes only. A person skilled in the relevant art will recognize that other components and configurations may be used without parting from the spirit and scope of the disclosure.

An exemplary embodiment of a system, method and/or computer program product, for identification of anomalies in indicators, such as key performance indicators (KPIs) of a telecom system may include any combination of various exemplary features set forth herein. An exemplary embodiment of the method learns over time behavior of an indicator and statistically identifies what should be considered an anomaly. In an exemplary embodiment, an indicator is a performance indicator, and an anomaly is a performance indicator anomaly. The learning, in an exemplary embodiment, is performed on a per indicator basis that each presents different statistical qualities. The exemplary method may associate the indicator to a profile, such as, e.g., but not limited to, one of several statistical distributions and may operate accordingly. Association of the exemplary indicator to an exemplary profile may be determined by the correlation of the indicator to the statistical distribution.

Further, according to an exemplary embodiment, the method may identify exemplary correlations between exemplary indicators when identifying the statistical distribution and especially when the associated statistical distribution is an unidentified profile.

According to an exemplary embodiment, the method further includes comparison of actuals versus prediction and may include in certain embodiments support to allow the sending of alerts and/or other notifications or communications, when anomalies are found. The system, according to an exemplary embodiment, is configured to receive data points respective of indicators and/or is configured to implement the disclosed exemplary method while continuously determining data points constituting anomalies, in an exemplary embodiment.

FIG. 1 depicts a schematic illustration of an indicator classification system 100 implemented according to an exemplary embodiment. The system 100 includes at least one processing element 110, for example, a central processing unit (CPU). According to an exemplary embodiment, the CPU is coupled via a bus 105 to a memory 120. The memory 120 includes, in an exemplary embodiment, a memory portion 122 that contains instructions that when executed by the processing element 110 performs the method described in more detail herein. The memory may be further used, according to an exemplary embodiment, as a working scratch pad for the processing element 110, a temporary storage, and/or others, as the case may be. The memory may comprise, in an exemplary embodiment, volatile memory such as, e.g., but not limited to, random access memory (RAM), and/or non-volatile memory (NVM), such as, e.g., but not limited to, Flash memory, etc. Memory 120 may further include, in an exemplary embodiment, a memory portion 124 containing a data point respective of a data series, according to an exemplary embodiment. The processing element 110 may be coupled to an input 150, in one exemplary embodiment. The processing element 110 may be further coupled with a database 130. Database 130, in an example embodiment, may be used for the purpose of holding a copy of the method executed in accordance with the disclosed technique. Database 130 may further include, e.g., but may not be limited to, a storage portion 135, which may include and/or contain a plurality of profiles for associating with a data series, in an exemplary embodiment. In one embodiment, the indicator classification system may be configured to execute the methods described herein with respect of FIG. 2. The exemplary method, system, and/or computer program products, may be hardwired or, presented as a series of instructions to be executed by the processing element 110.

Figure 2:
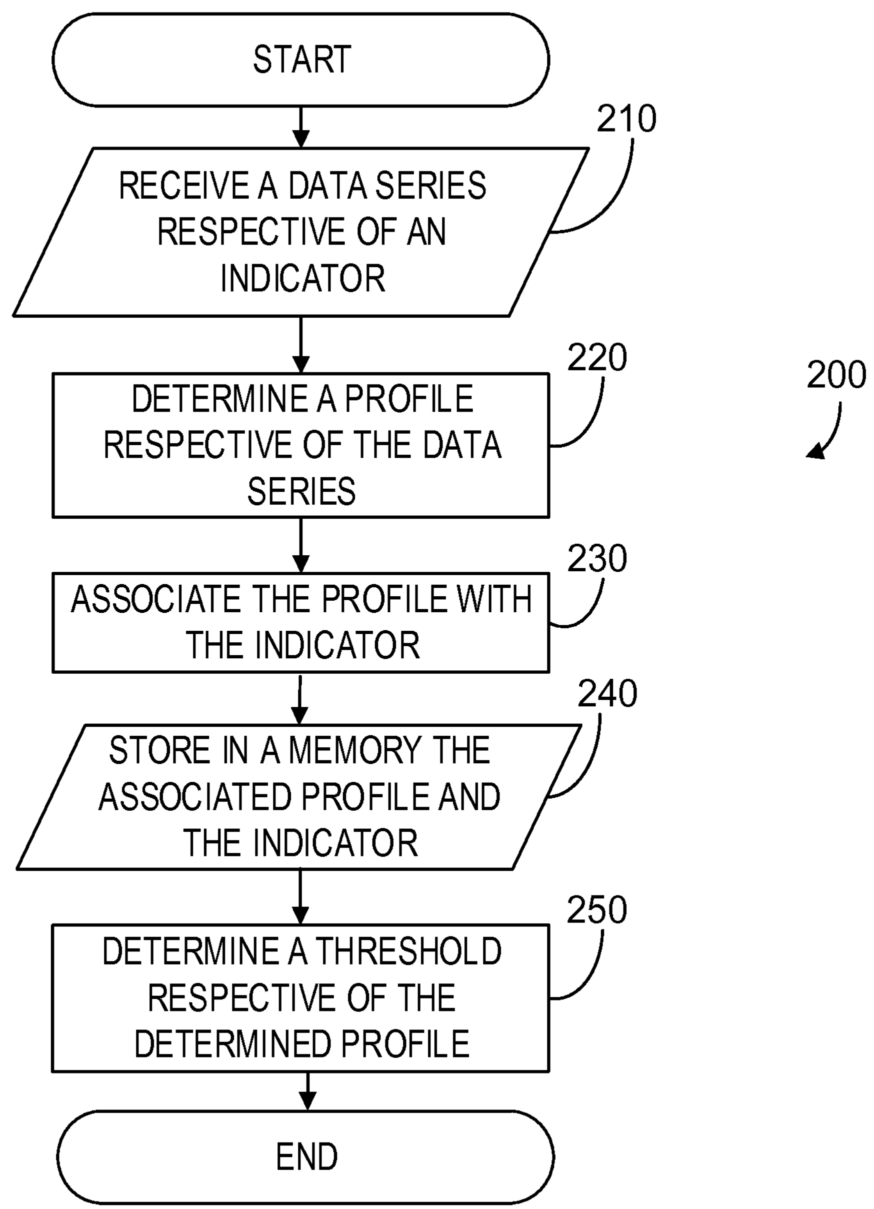
FIG. 2 depicts an illustrative flowchart of an exemplary method according to an example embodiment.

FIG. 2 is a non-limiting exemplary flowchart 200 of a computer implemented method for classification of an indicator respective of a data series according to an embodiment.

In 210 at least a data series respective of an indicator is received, for example, by an indicator classification system, such as, e.g., but not limited to, to classification system 100. The indicator may include in an exemplary embodiment a performance indicator, and may include, for example, but not limited to, a key performance indicator (KPI), a counter, and/or a key quality indicator (KQI), according to various exemplary embodiments. A data series may include a plurality of data points, in an exemplary embodiment. An indicator may be respective of a plurality of data series having different data points, in an exemplary embodiment. The indicator may be respective of a network entity of a telecommunication network, in one exemplary embodiment. The network entity may be a physical component, a logical component or combinations thereof, according to certain exemplary embodiments. In certain embodiments, the indicator may include a counter. The data points are respective of a data source, according to one exemplary embodiment. A data source may be, for example, a network element or element manager in a telecommunication network infrastructure, according to one exemplary embodiment.

A profile is determined for the indicator in 220 from a plurality of possible profiles, respective of the at least a data series, according to an exemplary embodiment. The determination can be performed, for example, but is not limited to, by correlating a data series with another data series, according to an exemplary embodiment. The profile may be a distribution profile, a behavioral profile and an unidentified profile, according to an exemplary embodiment.

A distribution profile is one of a normal distribution, a Poisson distribution or an unidentified distribution, according to an exemplary embodiment. The distribution is respective of the data points of the data series, for example, the distribution of the data points as a function of time. A value of the first parameter may be determined respective of the distribution profile. For a normal (i.e. Gaussian) distribution a first parameter may be the mean or the standard deviation, according to an exemplary embodiment.

A behavioral profile is for example, but not limited to, one in which a correlation exists between two sets of data points, in an illustrative embodiment.

An unidentified distribution is one in which the distribution for the data series is undetermined, for example, by having little or no correlation to another data series, according to an exemplary embodiment.

In 230 the indicator is associated with the determined profile, according to an exemplary embodiment. The associated profile is stored with the indicator in a memory, for example memory 120 of classification system 100 in 240, according to an exemplary embodiment. The indicator may be further stored in the memory 120 with the value of the first parameter.

In 250 a threshold is determined respective of the determined profile. In some embodiments, a noise to signal ratio respective of the distribution profile may be determined, treating the distribution profile as a signal. Thus a new data point, respective of a data series having an associated distribution profile, may be compared to previous data points of the data series sharing another trait (for example, a point in time, such as 8 am on a Monday) to determine if the data point is within an acceptable noise to signal ratio or if the data point is an anomalous deviation.

Such an anomalous deviation may be reported by a classification system 100, according to an exemplary embodiment. The acceptable noise to signal ratio may be a threshold which is, e.g., but not limited to, static, dynamic or adaptive, etc. Static thresholds are predetermined thresholds that remain constant, according to an exemplary embodiment. Dynamic thresholds are forcefully changed, for example, at a certain time of day, or a certain day of the year, according to an exemplary embodiment. Adaptive thresholds are changed in response to changes in characteristics of the network and may vary depending on a variety of parameters, according to an exemplary embodiment. The system 100 may update the noise to signal ratio as new data points are received, according to an exemplary embodiment.

In other embodiments a threshold may be determined respective of a parameter of the distribution profile. For example, a normal distribution profile has a standard deviation (typically represented by the Greek letter sigma a) parameter. The threshold may be determined as $-2\sigma$ to $+2\sigma$; any new data point whose value is over or under this threshold is reported, for example by classification system 100, as an anomalous deviation, according to one exemplary embodiment. The threshold may be static, dynamic or adaptive, according to an exemplary embodiment. Static thresholds are predetermined thresholds that remain constant, in an example embodiment. Dynamic thresholds are forcefully changed, for example, at a certain time of day, or a certain day of the year, according to an example embodiment. Adaptive thresholds are changed in response to changes in characteristics of the network and may vary depending on a variety of parameters, according to an example embodiment. The system may update the threshold as new data points are received, according to an example embodiment.

In certain embodiments, the system 100 may further determine feedback respective of at least a report of an anomalous deviation and adjusts a threshold, according to an example embodiment. For example, the feedback may be a counter of the number of reports generated respective of a certain threshold. If the counter is determined to have a value which is high or low, the threshold may be adjusted. In another example embodiment, the classification system 100 may monitor the actions of a user of the classification system 100, or a user of an alarm system to which reports, alerts, and/or notifications, may be sent. An action respective of the report may be changing the priority, erasing, and/or removing the report, and the like, according to an example embodiment. The threshold may be adjusted respective of the action or respective of a plurality of actions. The system may assign a weight to different methods of feedback and adjust the threshold according to the weighted feedback. Further, in some embodiments a correlation between a first data series and a second data series is performed, when the first data series is associated with an unidentified distribution profile, according to an example embodiment. For example, data series A may be highly correlated to data series B and data series C. Each data series B and C have a different profile, and as a result of the correlation data series A may have an unidentified profile. It can therefore be advantageous to report about this correlation and to additionally report data series A as having an unidentified profile, according to an exemplary embodiment.

The principles disclosed herein can be implemented as hardware, firmware, software or any combination thereof. Moreover, the software can be implemented as an application program tangibly embodied on a program storage unit or computer readable medium. The application program may be uploaded to, and/or be executed by, a machine comprising any suitable architecture. The machine may be implemented on a computer platform 100 having hardware such as, e.g., but not limited to, a processing unit ("CPU") 110, a memory 120, and/or input interfaces 150, output interfaces (not shown), as well as other components not shown for simplicity, but as would be well known to those skilled in the relevant art. The computer platform may also include, in an exemplary embodiment, an operating system and/or microinstruction code. The various processes and/or functions described herein may be either part of the microinstruction code and/or part of the application program, and/or any combination thereof, which may be executed by a CPU 110, whether or not such computer and/or processor is explicitly shown. In addition, various other peripheral units may be connected, and/or coupled, to the computer platform such as, e.g., but not limited to, an additional data storage unit, and a printing unit, and/or display unit, and/or other input, output, communication and/or networking components, etc.

References to "one embodiment," "an embodiment," "example embodiment," "various embodiments," "exemplary embodiment," "exemplary embodiments," etc., may indicate that the embodiment(s) so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these nontransitory signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. In one embodiment, a processor can include an ARM-processor based embedded or application processor device. In another embodiment, the computing platform can include a general purpose computing on graphics processing units (GPGPU) platform.

Embodiments may include apparatuses for performing the operations herein. An apparatus may be specially constructed for the desired purposes, or it may comprise a general purpose device selectively activated or reconfigured by a program stored in the device.

Computer programs (also called computer control logic), may include object oriented computer programs, and may be stored in memory 120, and/or secondary memory, such as, e.g., storage 130 and/or removable storage units (not shown), also called computer program products. Such computer programs, when executed, may enable the computer system 100 to perform the features as discussed herein. In particular, the computer programs, when executed, may enable the processor 110 to provide various functionality to the system 100 so as perform certain functions, according to an exemplary embodiment. Accordingly, such computer programs may represent controllers of the computer system 100.

In another exemplary embodiment, the methods may be directed to a computer program product comprising a computer readable medium having control logic (computer software) stored therein. The control logic, when executed by the processor 110, may cause the processor 110 to perform features as described herein. In another exemplary embodiment which may be implemented using software, the software may be stored in a computer program product and loaded into computer system 100 using, e.g., but not limited to, the storage 130, the removable storage drive, hard drive or communications interface (not shown), etc. The control logic (software), when executed by the processor 110, may cause the processor 110 to perform the functions as described herein. The computer software may run as a standalone software application program running atop an operating system, or may be integrated into the operating system, or may be executed as an applet, or via a browser and/or other process as is well known.

In yet another embodiment, implementation may be primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, as noted, implementation may be primarily in firmware.

In yet another exemplary embodiment, implementation may combine any of, e.g., but not limited to, hardware, firmware, and software, etc.

Exemplary embodiments may also be implemented as instructions stored on a machine-readable medium, which may be read and executed by a computing platform to perform the methods described herein. A machine-readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices; electrical, optical, acoustical or other form of nontransitory propagated signals (e.g., carrier waves, infrared signals, digital signals, etc.), and others.

The exemplary embodiments make reference to wired, or wireless networks. Wired networks can include any of a wide variety of well known means for coupling voice and data communications devices together. Similarly, any of various exemplary wireless network technologies may be used to implement the embodiments discussed.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While various embodiments have been described above, it should be understood that they have been presented by way of example only, and not limitation. Thus, the breadth and scope of the disclosure should not be limited by any of the above-described exemplary embodiments, but should instead be defined only in accordance with the following claims and their equivalents. It will be apparent to those skilled in the art that various modifications and variations can be made without departing from the spirit or scope of the disclosure. Thus, it is intended that the disclosure cover the modifications and variations provided they come within the scope of the appended claims and their equivalents.

What is claimed is:

1. A computer-implemented method comprising:

an automated electronic classification of electronically sensed or electronically captured data indicative of at least one electronic telecommunications system electronic telecommunications network performance indicator related to at least one electronic telecommunications system performance data series indicative of at least one electronic telecommunications system performance of at least one electronic telecommunications system used to set up, via electronic telecommunications signaling, and transport over an electronic telecommunications communications network, a plurality of voice and data telecommunications sessions, or voice and data telecommunications calls between a plurality of originating caller parties and destination called parties over the electronic telecommunications communications networks over a series of coupled data and voice telecommunications communications networks coupled via a plurality of telecommunications network elements, wherein the computer-implemented method comprises:

in an integrated practical application:

wherein the electronically receiving, by at least one electronic computer processor, from an electronic telecommunications network element or an electronic telecommunications element manager of the electronic telecommunications network, at least the at least one electronic telecommunications system performance data series related to the at least one electronic telecommunications system electronic telecommunications network performance indicator of the at least one electronic telecommunications system, the at least one electronic telecommunications system performance data series comprising at least one electronic telecommunications system performance data points, each of said at least one electronic telecommunications system performance data point measured by the electronic telecommunications network element or the electronic telecommunications element manager, and wherein the at least one electronic telecommunications system electronic telecommunications network performance indicator is related to at least one electronic telecommunications network entity of an electronic telecommunications network, and wherein the at least one electronic telecommunications system electronic telecommunications network performance indicator comprises at least one or more of:

a telecommunications key performance indicator (KPI); or a telecommunications key quality indicator (KQI);

wherein said at least one electronic telecommunications network entity comprises at least one or more of:

a physical network component, a logical network component, or a combination of a physical network component and a logical network component, and wherein the electronic telecommunications network comprises at least one or more of:

a wired telecommunications network, a wireless telecommunications network, or a combination of a wired telecommunications network and a wireless telecommunications network, and wherein the electronic telecommunications network couples a plurality of voice communications devices and data communications devices together;

electronically determining, by the at least one electronic computer processor, for the at least one electronic telecommunications system electronic telecommunications network performance indicator related to the at least one electronic telecommunications system performance data series of the electronic telecommunications system, an electronic telecommunications distribution profile from a plurality of electronic telecommunications distribution profiles, behavioral profiles, or unidentified distribution, wherein said determining comprises:

automatically learning, by the at least one electronic computer processor, wherein said learning is over time, behavior or trait of the at least one electronic telecommunications system electronic telecommunications network performance indicator;

electronically associating, by the at least one electronic computer processor, the at least one electronic telecommunications system electronic telecommunications network performance indicator with the determined electronic telecommunications distribution profile, comprising:

identifying, automatically statistically, or automatically mathematically, by the at least one electronic computer processor, at least one correlation between the at least one electronic telecommunications system electronic telecommunications network performance indicator, and the electronic telecommunications distribution profile;

electronically storing, by the at least one electronic computer processor, the associated electronic telecommunications distribution profile with the respective of the at least one electronic telecommunications system electronic telecommunications network performance indicator;

electronically receiving, by the at least one electronic computer processor, a current electronic telecommunications system electronic performance data point related to the at least one electronic telecommunications system performance data series;

electronically comparing, by the at least one electronic computer processor, the current electronic telecommunications system electronic performance data point to the associated electronic telecommunications distribution profile of the at least one electronic telecommunications system performance data series; and electronically statistically determining, by the at least one electronic computer processor, existence of an anomalous data point related to the current electronic telecommunications system performance data point and related to the telecommunications profile of the at least one electronic telecommunications system performance data series comprising:

electronically statistically identifying, by the at least one electronic computer processor, whether a value of the current electronic telecommunications system performance data point is anomalous, comprising:

electronically, automatically statistically, or automatically mathematically, determining, by the at least one electronic computer processor, whether the value at least one of:

exceeds, or is outside an acceptable range of, an electronically calculated statistical threshold related to the associated electronic telecommunications distribution profile; and wherein the electronic telecommunications distribution profile comprises:

an electronic telecommunications system performance distribution, and wherein the electronic telecommunications system performance distribution comprises electronically statistically analyzing at least one or more of:

a normal electronic telecommunications system performance distribution;

a Gaussian electronic telecommunications system performance distribution;

a Poisson electronic telecommunications system performance distribution; or an unidentified electronic telecommunications system performance distribution; and wherein if the electronic telecommunications distribution profile comprises the Gaussian or the normal electronic telecommunications system performance distributions, said electronically determined threshold for determining if a data point is anomalous, is determined by determining if said data point is falling outside a statistical range, said statistical range comprises:

greater than a positive two (2) sigma (σ) standard deviations from the mean; or less than a negative two (2) sigma (σ) standard deviations from the mean.

2. The computer-implemented method of claim 1, further comprising:

electronically first determining, by the at least one computer processor, an electronic telecommunications noise to telecommunications signal ratio related to the electronic telecommunications distribution profile;

electronically second determining, by the at least one computer processor, a threshold relating to said electronic telecommunications noise to telecommunications signal ratio;

electronically comparing, by the at least one computer processor, at least one of said data points to said threshold of said electronic telecommunications noise to telecommunications signal ratio;

electronically third determining, by the at least one computer processor, if said at least one data point exceeds an acceptable range of said electronic telecommunications noise to telecommunications signal ratio;

electronically fourth determining, by the at least one computer processor, that said at least one data point is an anomalous deviation based on said third determining; and electronically reporting, by the at least one computer processor, by a classification system said anomalous deviation.

3. The computer-implemented method of claim 1, further comprising:

electronically automatically statistically or automatically mathematically determining, by the at least one computer processor, a correlation of a first of the at least one electronic telecommunications system performance data series with at least a second of the at least one electronic telecommunications system performance data series, wherein the first of the at least one electronic telecommunications system performance data series is associated with an unidentified electronic telecommunications distribution profile.

4. The computer-implemented method of claim 1, wherein the electronic telecommunications distribution profile comprises an electronic telecommunications system performance distribution profile and further comprising:

electronically automatically statistically or automatically mathematically determining, by the at least one electronic computer processor, at least a first parameter related to the electronic telecommunications system performance distribution profile and related to the at least one electronic telecommunications system performance data series.

5. The computer-implemented method of claim 4, further comprising:

electronically automatically statistically or automatically mathematically determining electronic data indicative of an electronic telecommunications system performance threshold related to the at least a first parameter.

6. The computer-implemented method of claim 1, further comprising:

electronically reporting, by the at least one computer processor, identification of the at least one electronic telecommunications system performance data series or the at least one electronic telecommunications system electronic telecommunications network performance indicator, wherein the associated related electronic telecommunications distribution profile is an unidentified electronic telecommunications distribution profile.

7. The computer-implemented method of claim 6, further comprising:

electronically receiving, by the at least one computer processor, a new electronic telecommunications distribution profile related to the at least one electronic telecommunications system performance data series identified to have the unidentified electronic telecommunications distribution profile.

8. The computer-implemented method of claim 6, further comprising:

electronically associating, by the at least one computer processor, the at least one electronic telecommunications system performance data series identified to have the unidentified electronic telecommunications distribution profile with an existing electronic telecommunications distribution profile of the plurality of possible electronic telecommunications distribution profiles.

9. The computer-implemented method of claim 1, wherein the at least one electronic telecommunications system electronic telecommunications network performance indicator comprises at least one or more of:

an electronic telecommunications network key performance indicator (KPI), wherein said KPI comprises at least one or more of:

delay indicator;

loss indicator;

throughput indicator;

a system downtime indicator;

a number of dropped calls indicator;

a plurality of classified internal indicators;

telecommunications network performance indicators;

indicators essential for operation, or maintenance;

reportable performance indicators; or auditable performance indicators, an electronic telecommunications network counter, wherein, said counter comprises at least one or more of:

telecommunications hardware specific event data point counter;

a group of at least one event included in a given counter;

specific hardware system counter;

changes of network characteristics data point counter;

or comparison of at least one counter, or an electronic telecommunications network key quality indicator (KQI), wherein said KQI comprises at least one or more of:

a plurality of classified external indicators;

an indicator for QoS assessment perceived by a user;

an indicator independent of hardware;

an indicator independent of operator;

a service availability indicator;

a usability indicator;

a reliability indicator;

an anomaly indicator;

a monitoring indicator;

a regulatory indicator;

an European Telecommunications Standards Institute (ETSI) standard KQI indicator;

an International Telecommunication Union Telecommunication sector (ITU-T) standard KQI indicator;

a mobile indicator; or a broadband indicator.

10. The computer-implemented method according to claim 1, wherein network element of said electronic telecommunications system comprises at least one or more of:

at least one voice telephony device;

at least one phone;

at least one wireless phone;

at least one wireless telephony communications device;

at least one mobile wireless telephony device;

at least one wireless telephony device;

at least one voice gateway;

at least one voice switch;

at least one voice telephony signaling system device;

at least one voice-over-IP communications user device; or at least one router configured to transport voice communications.

11. The method according to claim 1, wherein said automatically learning, over time, the behavior of the at least one electronic telecommunications system electronic telecommunications network performance indicator, comprises at least one or more of:

automatically receiving, by the at least one electronic computer processor, feedback related to at least one report of an anomalous deviation, and adjusting a given threshold based on received feedback;

automatically receiving, by the at least one electronic computer processor, a counter of a number of reports of anomalies related to a given threshold;

automatically receiving, by the at least one electronic computer processor, feedback and iteratively incorporating said feedback into or adjusting a given threshold related to said feedback;

automatically monitoring, by the at least one electronic computer processor, actions of user of a classification system;

automatically monitoring, by the at least one electronic computer processor, actions of a user of an alarm system;

automatically changing, by the at least one electronic computer processor, priority of a report;

automatically erasing, by the at least one electronic computer processor, a report;

automatically removing, by the at least one electronic computer processor, a report;

automatically adjusting, by the at least one electronic computer processor, a threshold;

automatically adjusting, by the at least one electronic computer processor, a threshold related to at least one actions;

automatically assigning, by the at least one electronic computer processor, a weight to a plurality of feedback and adjusting a given threshold based on weighted feedback; or automatically performing, by the at least one electronic computer processor, a correlation.

12. An electronic system comprising:

an automated electronic classification of electronic data indicative of at least one electronic telecommunications system electronic telecommunications network performance indicator related to at least one electronic telecommunications system performance data series indicative of electronic telecommunications system performance of an electronic telecommunications system used to set up, via communications signaling, and transport over an electronic communications network, a plurality of voice and data communications sessions or voice and data communications calls between a plurality of originating caller parties and destination called parties over the electronic communications networks over a series of coupled data and voice networks coupled via a plurality of communications network elements, comprising, in an integrated practical application:

at least one electronic computer processing unit;

an electronic network interface communicatively coupled to the at least one electronic computer processing unit;

an electronic memory communicatively coupled to the at least one electronic computer processing unit, the electronic memory containing instructions that when executed by the at least one electronic computer processing unit configure the electronic system to:

electronically receive, from an electronic communications network element or an electronic communications element manager of an electronic telecommunications network, at least the at least one electronic telecommunications system performance data series related to the at least one electronic telecommunications system electronic telecommunications network performance indicator, the at least one electronic telecommunications system performance data series comprising electronic telecommunications system performance data points, each electronic telecommunications system performance data point measured by the electronic telecommunications network element or the electronic telecommunications element manager, and wherein the at least one electronic telecommunications system electronic telecommunications network performance indicator comprises at least one or more of:

a telecommunications key performance indicator (KPI); or a telecommunications key quality indicator (KQI);

wherein the electronic telecommunications system performance is related to at least one electronic network entity of an electronic telecommunications network, wherein said at least one electronic network entity comprises at least one or more of:

a physical component, a logical component, or a combination of a physical component and a logical component, and wherein the electronic telecommunications network comprises at least one or more of:

a wired communications network, a wireless communications network, or a combination of a wired communications network and a wireless communications network, and wherein the electronic telecommunications network couples a plurality of voice communications devices or data communications devices together;

electronically determine, for the at least one electronic telecommunications system electronic telecommunications network performance indicator related to at least the at least one electronic telecommunications system performance data series an electronic telecommunications distribution profile from a plurality of possible electronic telecommunications distribution profiles, behavioral profiles, or unidentified distribution, wherein said determine comprises:

automatically learn, wherein said learn is over time, behavior or trait of the at least one electronic telecommunications system electronic telecommunications network performance indicator;

electronically associate, the at least one electronic telecommunications system electronic telecommunications network performance indicator with the determined electronic telecommunications distribution profile comprising:

identify, automatically statistically, or automatically mathematically, at least one correlation between the at least one electronic telecommunications system electronic telecommunications network performance indicator, and the electronic telecommunications distribution profile;

electronically store, the associated electronic telecommunications distribution profile with the determined of the at least one of the electronic telecommunications system electronic telecommunications network performance indicator;

electronically receive, a current electronic telecommunications system performance data point related to the at least one electronic telecommunications system performance data series;

electronically compare, the current electronic telecommunications system performance data point to the electronic telecommunications profile of the at least one electronic telecommunications system performance data series; and electronically statistically determine, existence of an anomalous electronic telecommunications system performance data point related to the current electronic telecommunications system performance data point and related to the electronic telecommunications profile of the at least one electronic telecommunications system performance data series comprising:

electronically statistically identify whether a value of the current electronic telecommunications system performance data point is anomalous, comprising:

electronically, automatically statistically, or automatically mathematically, determine whether the value at least one of:

exceeds, or is outside an acceptable range of, an electronically calculated statistical threshold related to the associated electronic telecommunications distribution profile; and wherein the electronic telecommunications distribution profile comprises:

an electronic telecommunications system performance distribution, and wherein the electronic telecommunications system performance distribution comprises being configured to electronically statistically analyze at least one or more of:

a normal electronic telecommunications system performance distribution;

a Gaussian electronic telecommunications system performance distribution;

a Poisson electronic telecommunications system performance distribution; or an unidentified electronic telecommunications system performance distribution; and wherein if the electronic telecommunications distribution profile comprises the Gaussian or the normal electronic telecommunications system performance distributions, said electronically calculated statistical threshold is configured to determine if a data point is anomalous, by being configured to determine if said data point falls outside a statistical range, wherein said statistical range comprises:

greater than a positive two (2) sigma ($\sigma$) standard deviations from the mean; or less than a negative two (2) sigma ($\sigma$) standard deviations from the mean.

13. The electronic system of claim 12, wherein the electronic telecommunications distribution profile comprises:

an electronic telecommunications system performance distribution profile and wherein the electronic memory further comprises:

instructions that when executed by the at least one electronic computer processing unit configure the electronic system to:

electronically statistically determine at least a first parameter related to the electronic telecommunications distribution profile and related to the at least the at least one electronic telecommunications system performance data series.

14. The electronic system of claim 13, wherein the memory further comprises:

instructions that when executed by the at least one electronic computer processing unit configure the electronic system to:

electronically statistically determine electronic data indicative of a threshold related to the at least the first parameter.

15. The electronic system of claim 12, wherein the electronic memory further comprises:

instructions that when executed by the at least one electronic computer processing unit configure the electronic system to:

electronically first determine an electronic telecommunications noise to signal ratio related to the electronic telecommunications distribution profile;

electronically second determine a threshold relating to said electronic telecommunications noise to telecommunications signal ratio;

electronically compare at least one of said data points to said threshold of said electronic telecommunications noise to telecommunications signal ratio;

electronically third determine if said at least one data point exceeds an acceptable range of said electronic telecommunications noise to telecommunications signal ratio;

electronically fourth determine that said at least one data point is an anomalous deviation based on said third determination; and electronically report by a classification system said anomalous deviation.

16. The electronic system of claim 12, wherein the electronic memory further comprises:

instructions that when executed by the at least one electronic computer processing unit configure the electronic system to:

electronically determine a correlation of a first of the at least one electronic telecommunications system performance data series with at least a second of the at least one electronic telecommunications system performance data series, wherein the first of the at least one electronic telecommunications system performance data series is associated with an unidentified electronic telecommunications distribution profile.

17. The electronic system of claim 12, wherein the electronic memory further comprises:

instructions that when executed by the at least one electronic computer processing unit configure the electronic system to:

electronically report identification of the at least one electronic telecommunications system performance data series or the at least one electronic telecommunications system electronic telecommunications network performance indicator wherein the associated electronic telecommunications distribution profile comprises an unidentified electronic telecommunications distribution profile.

18. The electronic system of claim 17, wherein the electronic memory further comprises:

instructions that when executed by the at least one electronic computer processing unit configure the electronic system to:

electronically receive a new telecommunications distribution profile related to the at least one telecommunications system performance data series identified to have the unidentified electronic telecommunications distribution profile.

19. The electronic system of claim 17, wherein the electronic memory further comprises:

instructions that when executed by the at least one electronic computer processing unit configure the electronic system to:

electronically associate the at least one electronic telecommunications system performance data series identified to have the unidentified electronic telecommunications distribution profile with an existing electronic telecommunications distribution profile of the plurality of possible electronic telecommunications distribution profiles.

20. The electronic system of claim 12, wherein the at least one electronic telecommunications system electronic telecommunications network performance indicator comprises at least one or more of:

an electronic telecommunications network key performance indicator (KPI), wherein said KPI comprises at least one or more of:

delay indicator;

loss indicator;

throughput indicator;

a system downtime indicator;

a number of dropped calls indicator;

a plurality of classified internal indicators;

telecommunications network performance indicators;

indicators essential for operation, or maintenance;

reportable performance indicators; or auditable performance indicators, an electronic telecommunications network counter, wherein, said counter comprises at least one or more of:

telecommunications hardware specific event data point counter;

a group of at least one event included in a given counter;

specific hardware system counter;

changes of network characteristics data point counter; or comparison of at least one counter, or an electronic telecommunications network key quality indicator (KQI), wherein said KQI comprises at least one or more of:

a plurality of classified external indicators;

an indicator for QoS assessment perceived by a user;

an indicator independent of hardware;

an indicator independent of operator;

a service availability indicator;

a usability indicator;

a reliability indicator;

an anomaly indicator;

a monitoring indicator;

a regulatory indicator;

an European Telecommunications Standards Institute (ETSI) standard KQI indicator;

an International Telecommunication Union Telecommunication sector (ITU-T) standard KQI indicator;

a mobile indicator; or a broadband indicator.

21. The electronic system according to claim 12, wherein said network element of said electronic telecommunications system comprises at least one or more of:

at least one voice telephony device;

at least one phone;

at least one wireless phone;

at least one wireless telephony communications device;

at least one mobile wireless telephony device;

at least one wireless telephony device;

at least one voice gateway;

at least one voice switch;

at least one voice telephony signaling system device;

at least one voice-over-IP communications user device; or at least one router configured to transport voice communications.

22. A computer program product embodied on a nontransitory electronic computer accessible medium, the computer program product comprising program logic, which when executed on at least one electronic computer processor provides a computer-implemented method of automated electronic classification of data indicative of at least one electronic telecommunications system electronic telecommunications network performance indicator related to at least one electronic communications telecommunications system performance data series indicative of electronic communications telecommunications system performance of an electronic telecommunications system used to set up, via communications signaling, and transport over an electronic communications network, a plurality of voice and data communications sessions or voice and data communications calls between a plurality of originating caller parties and destination called parties over the electronic telecommunications networks over a series of coupled data and voice networks coupled via a plurality of telecommunications network elements, the computer-implemented method comprising, in an integrated practical application:

electronically receiving, by the at least one electronic computer processor, from an electronic communications network element or electronic communications element manager of an electronic telecommunications network, at least the at least one electronic telecommunications system performance data series related to the at least one electronic telecommunications system electronic telecommunications network performance indicator, the at least one electronic telecommunications system performance data series comprising electronic telecommunications system performance data points, each electronic telecommunications system performance data point measured by the electronic telecommunications network element or the electronic telecommunications element manager, and wherein the at least one electronic telecommunications system electronic telecommunications network performance indicator comprises at least one or more of:

a telecommunications key performance indicator (KPI); or a telecommunications key quality indicator (KQI);

wherein the electronic telecommunications system performance is related to at least one electronic telecommunications network entity of an electronic telecommunications network, wherein said at least one electronic network entity comprises at least one or more of:

a physical network component, a logical network component, or a combination of a physical network component and a logical network component, and wherein the electronic telecommunications network comprises at least one or more of:

a wired telecommunications network, a wireless telecommunications network, or a combination of a wired telecommunications network and a wireless telecommunications network, and wherein the electronic telecommunications network couples a plurality of voice telecommunications devices or data telecommunications devices together;

electronically determining, by the at least one electronic computer processor, for the at least one electronic telecommunications system electronic telecommunications network performance indicator related to the at least one electronic telecommunications system performance data series, an electronic telecommunications distribution profile from a plurality of possible electronic telecommunications distribution profiles, behavioral profiles, or unidentified distribution, wherein said determining comprises:

automatically learning, by the at least one electronic computer processor, wherein said learning is over time, behavior or trait of the at least one electronic telecommunications system electronic telecommunications network performance indicator;

electronically associating, by the at least one electronic computer processor, the at least one electronic telecommunications system electronic telecommunications network performance indicator with the respective determined electronic telecommunications distribution profile, comprising:

identifying, automatically statistically, or automatically mathematically, by the at least one electronic computer processor, at least one correlation between the at least one electronic telecommunications system electronic telecommunications network performance indicator, and the electronic telecommunications distribution profile;

electronically storing, by the at least one electronic computer processor, the associated electronic telecommunications distribution profile with the respective of the at least one electronic telecommunications system electronic telecommunications network performance indicator;

electronically receiving, by the at least one electronic computer processor, a current data point related to the at least one electronic telecommunications system performance data series;

electronically comparing, by the at least one electronic computer processor, the current data point to the electronic telecommunications distribution profile of the at least one electronic telecommunications system performance data series; and electronically automatically statistically or automatically mathematically determining, by the at least one electronic computer processor, existence of an anomalous electronic telecommunications system performance data point related to the current electronic telecommunications system performance data point and related to the electronic telecommunications distribution profile of the at least one electronic telecommunications system performance data series comprising:

electronically statistically identifying, by the at least one electronic computer processor, whether a value of the current electronic telecommunications system performance data point is anomalous, comprising:

electronically, automatically statistically, or automatically mathematically, determining, by the at least one electronic computer processor, whether the value at least one of:

exceeds, or is outside an acceptable range of, an electronically calculated statistical threshold related to the associated electronic telecommunications distribution profile; and wherein the electronic telecommunications distribution profile comprises:

an electronic telecommunications system performance distribution, and wherein the electronic telecommunications system performance distribution comprises electronically statistically analyzing at least one or more of:

a normal electronic telecommunications system performance distribution;

a Gaussian electronic telecommunications system performance distribution;

a Poisson electronic telecommunications system performance distribution; or an unidentified electronic telecommunications system performance distribution; and wherein if the electronic telecommunications distribution profile comprises the Gaussian or the normal electronic telecommunications system performance distributions, said electronically determined threshold for determining if a data point is anomalous, is determined by determining if said data point is falling outside a statistical range, said statistical range comprises:

greater than a positive two (2) sigma (σ) standard deviations from the mean; or less than a negative two (2) sigma (σ) standard deviations from the mean.

23. The computer program product of claim 22, wherein the computer-implemented method further comprises:

electronically first determining, by the at least one computer processor, an electronic telecommunications noise to telecommunications signal ratio related to the electronic telecommunications system performance distribution profile;

electronically second determining a threshold relating to said electronic telecommunications noise to telecommunications signal ratio;

electronically comparing at least one of said data points to said threshold of said electronic telecommunications noise to telecommunications signal ratio;

electronically third determining if said at least one data point exceeds an acceptable range of said electronic telecommunications noise to telecommunications signal ratio;

electronically fourth determining that said at least one data point is an anomalous deviation based on said third determining; and electronically reporting by a classification system said anomalous deviation.

24. The computer program product of claim 22, wherein the computer-implemented method further comprises:

electronically determining, by the at least one computer processor, at least one correlation of a first of the at least one electronic telecommunications system performance data series with at least a second of the at least one electronic telecommunications system performance data series, wherein the first of the at least one electronic telecommunications system performance data series is associated with an unidentified electronic telecommunications distribution profile.

25. The computer program product of claim 22, wherein the electronic telecommunications distribution profile comprises an electronic telecommunications system performance distribution profile and the computer-implemented method further comprises:

electronically automatically statistically or automatically mathematically determining, by the at least one computer processor, at least a first parameter related to the electronic telecommunications system performance distribution profile and related to the at least one electronic telecommunications system performance data series.

26. The computer program product of claim 22, wherein the computer-implemented method further comprises:

electronically reporting, by the at least one computer processor, identification of the at least one electronic telecommunications system performance data series or the at least one electronic telecommunications system electronic telecommunications network performance indicator, wherein the associated respective electronic telecommunications profile is an unidentified electronic telecommunications distribution profile.

27. The computer program product of claim 26, wherein the computer-implemented method further comprises:

electronically receiving, by the at least one computer processor, a new electronic telecommunications distribution profile related to the at least one electronic telecommunications system performance data series identified to have the unidentified electronic telecommunications distribution profile.

28. The computer program product of claim 26, wherein the computer-implemented method further comprises:

electronically associating, by the at least one computer processor, the at least one electronic telecommunications system performance data series identified to have the unidentified electronic telecommunications distribution profile with an existing electronic telecommunications distribution profile of the plurality of possible electronic telecommunications distribution profiles.

29. The computer program product of claim 22, wherein the at least one electronic telecommunications system electronic telecommunications network performance indicator comprises at least one or more of:

an electronic telecommunications network key performance indicator (KPI)),
  wherein said KPI comprises at least one or more of:
    delay indicator;
    loss indicator;
    throughput indicator;
    a system downtime indicator;
    a number of dropped calls indicator;
    a plurality of classified internal indicators;
    telecommunications network performance indicators;
    indicators essential for operation, or maintenance;
    reportable performance indicators; or
    auditable performance indicators,
an electronic telecommunications network counter,
  wherein, said counter comprises at least one or more of:
    telecommunications hardware specific event data point counter;
    a group of at least one event included in a given counter;
    specific hardware system counter;
    changes of network characteristics data point counter; or
    comparison of at least one counter, or
an electronic telecommunications network key quality indicator (KQI),
  wherein said KQI comprises at least one or more of:
    a plurality of classified external indicators;
    an indicator for QoS assessment perceived by a user;
    an indicator independent of hardware;
    an indicator independent of operator;
    a service availability indicator;
    a usability indicator;
    a reliability indicator;
    an anomaly indicator;
    a monitoring indicator;
    a regulatory indicator;
    an European Telecommunications Standards Institute (ETSI) standard KQI indicator;
    an International Telecommunication Union-Telecommunication sector (ITU-T) standard KQI indicator;
    a mobile indicator; or
    a broadband indicator.

30. The computer program product according to claim 22, wherein said electronic telecommunications system, wherein said network element comprises at least one or more of:

at least one voice telephony device;
at least one phone;
at least one wireless phone;
at least one wireless telephony communications device;
at least one mobile wireless telephony device;
at least one wireless telephony device;
at least one voice gateway;
at least one voice switch;
at least one voice telephony signaling system device;
at least one voice-over-IP communications user device; or
at least one router configured to transport voice communications.

* * * * *